United States Patent
Zimmermann

(10) Patent No.: US 12,163,560 B2
(45) Date of Patent: *Dec. 10, 2024

(54) FREEWHEEL OF A VEHICLE

(71) Applicant: Robert Bosch GmbH, Stuttgart (DE)

(72) Inventor: Christoph Zimmermann, Nehren (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,616

(22) Filed: Dec. 9, 2023

(65) Prior Publication Data

US 2024/0209902 A1 Jun. 27, 2024

(30) Foreign Application Priority Data

Dec. 22, 2022 (DE) ...................... 10 2022 214 309.4

(51) Int. Cl.
| | | |
|---|---|---|
| *F16D 41/02* | (2006.01) | |
| *F16D 41/20* | (2006.01) | |
| *F16D 41/36* | (2006.01) | |
| F16D 41/30 | (2006.01) | |
| F16D 125/40 | (2012.01) | |

(52) U.S. Cl.
CPC ............ *F16D 41/20* (2013.01); *F16D 41/36* (2013.01); *F16D 41/30* (2013.01); *F16D 2125/40* (2013.01)

(58) Field of Classification Search
CPC .......... F16D 41/02; F16D 41/36; F16D 41/30; F16D 2125/40
See application file for complete search history.

(56) References Cited

U.S. PATENT DOCUMENTS

| | | | | |
|---|---|---|---|---|
| 2012/0285785 A1* | 11/2012 | Tho | ......................... | F16D 27/01 |
| | | | | 192/64 |
| 2013/0092496 A1* | 4/2013 | Tho | ....................... | B60B 27/047 |
| | | | | 192/64 |
| 2013/0126292 A1* | 5/2013 | Lin | .......................... | F16D 41/32 |
| | | | | 192/64 |
| 2016/0052337 A1* | 2/2016 | Tien | ....................... | F16D 41/24 |
| | | | | 301/110.5 |

(Continued)

FOREIGN PATENT DOCUMENTS

| | | | |
|---|---|---|---|
| CN | 214189172 U | * | 9/2021 |
| DE | 10 2018 132 429 A1 | | 7/2019 |
| DE | 10 2019 215 712 A1 | | 4/2021 |

*Primary Examiner* — Lori Wu
(74) *Attorney, Agent, or Firm* — Maginot, Moore & Beck LLP

(57) ABSTRACT

A freewheel of a vehicle, in particular a two-wheeler, includes (i) a first shaft, (ii) a second shaft having a first gear cog, (iii) a freewheel element having a second gear cog, and (iv) a friction element. The first gear cog and the second gear cog are configured to, when engaged with each other, effect a torque transfer between the second shaft and the freewheel element. The freewheel element is arranged to be displaceable in an axial direction on the first shaft. The freewheel element is arranged to be non-rotatable relative to the first shaft in the circumferential direction. The freewheel element and the friction element are connected to one another by way of a helical mechanism which is configured to effect a translational displacement of the freewheel element and the friction element relative to one another when the freewheel element and friction element rotate relative to one another.

18 Claims, 3 Drawing Sheets

(56) References Cited

U.S. PATENT DOCUMENTS

| | | | |
|---|---|---|---|
| 2018/0083384 A1* | 3/2018 | Burns | H01R 13/622 |
| 2019/0032730 A1* | 1/2019 | Walthert | F16D 41/36 |
| 2019/0241015 A1* | 8/2019 | Tien | B60B 27/0031 |
| 2020/0009908 A1* | 1/2020 | Walthert | F16D 41/36 |
| 2023/0234535 A1* | 7/2023 | Yulish | F16D 28/00 |
| | | | 192/41 R |

* cited by examiner

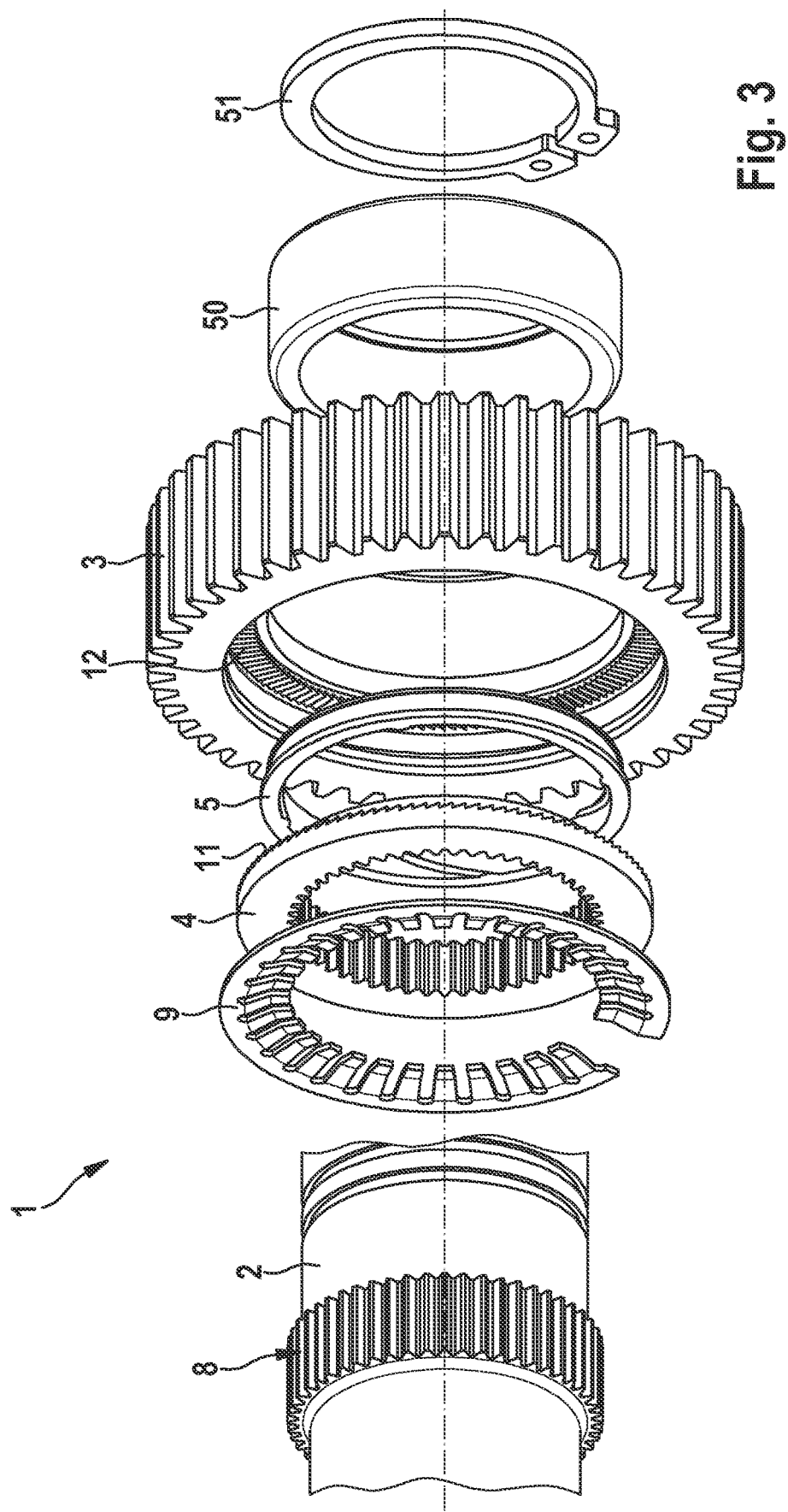

FREEWHEEL OF A VEHICLE

This application claims priority under 35 U.S.C. § 119 to patent application no. DE 10 2022 214 309.4, filed on Dec. 22, 2022 in Germany, the disclosure of which is incorporated herein by reference in its entirety.

BACKGROUND

The present disclosure relates to a freewheel of a vehicle, as well as a vehicle.

In vehicles, e.g. electric bikes, freewheels are known to date, which are configured to interrupt a connection between a driven drive element shaft and a motor gear unit, which is connected to the drive motor, if the driven drive element runs faster than an output of the motor gear unit with respect to the forward direction of rotation, i.e. in the direction of rotation that causes the vehicle to be driven in the forward direction of travel. The actuation of the freewheel is in this case often performed via a gear cog. Known is, e.g., a spring-loaded engagement of such a gear cog, in which case the removal of the torque transfer in the freewheel direction is, e.g., implemented by the teeth of a sawtooth cog sliding against one another.

SUMMARY

In contrast, the freewheel according to the disclosure with the features set forth herein is characterized by a particularly advantageous design, which functions in a particularly low-wear and low-noise manner in addition to a high robustness. According to the present disclosure, this is achieved by a freewheel of a vehicle, preferably of a two-wheeler, more preferably of an electric bike, comprising a first shaft, a second shaft, a freewheel element, and a friction element. In particular, the first shaft and the second shaft are rotatable about parallel axes, more preferably coaxial to one another. For example, the second shaft can comprise a drive shaft and/or a drive gear. The second shaft in this case comprises a first gear cog, in particular a front gear cog, and the freewheel element comprises a second gear cog, in particular a front gear cog. The first gear cog and the second gear cog in this case are, when engaged with each other, configured to effect a torque transfer between the second shaft and the freewheel element. In the context of the present disclosure, other geometrical shapes of positive-locking elements can in this case be used instead of teeth or sprockets, which effect a torque transfer between the output shaft and the freewheel element when engaged. In the context of the present disclosure, the term "gear cog" is then understood to mean interlocking elements which, when engaged, effect a torque transfer between the output shaft and the freewheel element. The freewheel element is displaceably arranged on the first shaft in the axial direction. In addition, the freewheel element is circumferentially arranged non-rotatably on the first shaft relative to the first shaft. The freewheel element and the friction element are coupled to each other by means of a helical mechanism. The helical mechanism is in this case configured to effect a translational displacement of the freewheel element and the friction element relative to each another when the freewheel element and friction element rotate relative to each other.

In other words, a freewheel function is provided by implementing a helical mechanism that can be actuated by means of friction closure to engage and disengage the gear cog. In other words, the specific design of the freewheel implements a relative rotation of the first shaft and the second shaft into a relative rotation of the friction element and the freewheel element via the force closure on the friction element. The helical mechanism in this case causes the freewheel element to be displaced in the axial direction on the first shaft and thus, in particular, to be displaced away from or towards the first gear cog of the second shaft in order to either disengage or engage the gear cog engagement.

The helical mechanism can in this case be designed in a variety of ways. For example, interlocking helix-shaped elements can be provided on the freewheel element and/or the friction element. Furthermore, any other desired interlocking elements can be arranged on the friction element and the freewheel element, e.g., similar to a slotted guide designed to translate the relative rotation into a relative translational displacement along the axis.

The freewheel thereby offers the advantage that a particularly reliable and robust function of the freewheel can be achieved with a particularly simple and cost-efficient design, which also has advantageous properties in terms of wear and noise generation. In detail, all elements involved in the function can, e.g., be mechanically designed to be particularly robust and designed such that reliable malfunctions can be reliably prevented due to the direct mechanical coupling in the directions of movement or actuation of the freewheel. In addition, since the engagement or disengagement of the gear cog is implemented in a particularly targeted and in especially forced manner by the helical mechanism, for example, undesired slipping of the gear cog can, e.g., be prevented over a longer period of time, which on the one hand prevents noise and on the other hand ensures low wear. In addition, the tooth engagement can in this case be performed in a particularly robust and reliable gripping manner.

Preferred embodiments of the disclosure are also set forth herein.

Preferably, the helical mechanism comprises a thread. In other words, a thread is formed between the freewheel element and the friction element, which effects the corresponding function of translational displacement during relative rotation to each other. The desired kinematics of the coupling between the freewheel element and the friction element can thus be implemented in a particularly simple and cost-efficient manner, and particularly reliably. The thread can in this case be designed in a variety of ways, e.g., in particular as a standard metric thread, or as any desired thread featuring any desired pitch, or the like.

Particularly preferably, the thread is designed not to be self-inhibiting. In particular, the thread is in this case designed such that, preferably if only the return force acts on the freewheel element and there is no disengaging force by a relative rotation, the freewheel element is moved automatically via the thread towards the first gear cog of the second shaft by the return force of the return element. In other words, the thread is designed by a lack of self-inhibition such that it enables translational movement of the freewheel element along the axis caused by the return element. As a result, a particularly simple and inexpensive design of the freewheel can be enabled, which provides the automatic locking of the freewheel with particularly low reaction time.

Preferably, the freewheel further comprises a return element, which is arranged and configured to apply a return force on the freewheel element. The return force is oriented in the direction of the first gear cog of the second shaft. The return element and its return force in this case cause the freewheel element and the friction element to be moved together, in particular if there is no disengaging force due to the force closure, i.e., if there is an unloaded state of the freewheel. As a result, by means of the return element, the cog wheels are automatically engaged when the relative rotation of the freewheel element and the friction element stops. Furthermore, the automatic return by means of the return element provides the advantage that a particularly low reaction time of the re-engaging of the cog wheels is enabled. In other words, if there is no more relative rotation in the freewheel direction, the freewheel is again locked by the return force in a particularly short time, so that torque transfer in the locking direction can be immediately enabled.

Preferably, the force closure, the helical mechanism, and the return element are designed such that a disengaging force caused by the force closure and the helical mechanism when the freewheel element and the friction element rotate relative to one another is greater than the return force of the return element. In other words, the freewheel is designed so that in the case of the relative rotation of the freewheel element and the friction element in the freewheel direction, the return force is overcompensated by the disengagement force causing cog gear cogs to disengage. A particularly reliable and precisely defined function of the freewheel can be provided thereby.

Further preferably, the return element is an axial spring disc. In other words, the return element has a disc-shaped design, preferably such that the return force is generated in the axial direction by the axial spring disc. For example, the axial spring disc can in this case be designed to be tapered in cross section. A particularly simple, lightweight, and cost-efficient freewheel design can be enabled thereby.

In one embodiment, a predetermined force closure is formed between the second shaft and the friction element in the circumferential direction of the second shaft. This enables a compact and simple design of the freewheel.

Particularly preferably, the force closure between the second shaft and the friction element comprises a friction force in the circumferential direction, in particular with respect to the second shaft. In other words, the friction force is oriented in a tangential direction with respect to the second shaft. In particular, the friction element can in this case be at least partially designed as a hollow shaft. For example, the friction force can be effected by a radial adhesive force between the friction element and the second shaft. The actuation of the helical mechanism can thereby be easily and purposefully adjusted via the friction force.

Preferably, the friction force is generated by means of at least one screw and/or by means of a friction ring. For example, the at least one screw can be screwed into the friction element and push in the radial direction against the second shaft with a predetermined screwing force. The screwing force, and therefore the friction force, can thus be generated and adjusted in a particularly simple manner. Multiple screws distributed around the circumference of the second shaft are particularly advantageous. A friction ring can, e.g., be arranged as an additional element between the friction element and the second shaft. In this case, the friction force can, e.g., be designed as a function of surface roughness and/or fits between the friction element and the friction ring and/or between the second shaft and the friction ring, which also enables a simple and cost-efficient design.

Further preferably, the force closure between the second shaft and the friction element comprises a magnetic force. In other words, the magnetic force is provided between the friction element and the second shaft such that it effects the predetermined friction closure in the circumferential direction. For example, permanent magnets can in this case be arranged on the friction element and/or the second shaft. The force closure can thus also be designed in a simple and particularly targeted manner.

Particularly preferably, the freewheel further comprises a stop limiting the translational displacement of the freewheel element relative to the friction element. In particular, the stop is designed to limit a displacement of the freewheel element away from the first gear cog. Preferably, when the freewheel element thereby adjoins the stop and during further relative rotation of the second shaft and first shaft, the force closure between the second shaft and the friction element is overcome, so that the second shaft can rotate relative to the friction element. The stop enables a particularly compact and precisely defined design of the freewheel.

Preferably, the reset element, in particular in the axial direction, is arranged between the stop and the freewheel element. A compact design of the freewheel with few components is enabled thereby.

Preferably, the stop is designed such that the two gear cogs are completely disengaged from each other when the freewheel element adjoins the stop. In other words, the stop enables such a relative translational displacement of the freewheel element towards the friction element, so the two gear cogs no longer touch each other when the stop is reached. A particularly low-wear operation of the freewheel can thereby be ensured.

Further preferably, the helical mechanism is designed such that the tooth engagement of the two gear cogs is disengaged by the relative translational displacement during a relative rotation of the freewheel element and the friction element in the freewheel direction. In addition, the helical mechanism is designed such that the relative translational displacement of the freewheel element and the friction element in relation to each other during relative rotation in the locking direction engages the tooth engagement of the gear cogs. In other words, during rotation in the freewheel direction, a torque transfer between the first shaft and second shaft is removed, and torque transfer is enabled during rotation in the opposite locking direction.

Preferably, the friction element is attached to the second shaft in an axially non-rotatable manner. In particular, sub-regions of the second shaft and the friction element intersect in the axial direction. Preferably, both sides of the friction element are in this case attached to the second shaft in an axially non-rotatable manner.

Preferably, the freewheel element is attached to the first shaft in an axially displaceable manner and in a non-rotatable manner in the circumferential direction by means of a radial gear cog. For example, a splined connection between the freewheel element and the first shaft can be designed as a radial gear cog. For example, the radial cog wheel can be straight in the axial direction or, alternatively, can be designed as a helical gear cog. Robust torque transfer between the freewheel element and the first shaft is thereby ensured in a simple manner while ensuring functionality.

Preferably, the gear cogs are designed as sawtooth cogs or Hirth cogs. Sawtooth cogs are considered to be gear cogs having different inclined tooth flanks relative to an axial direction. In this case, one of the two tooth flanks of each tooth can, e.g., be arranged parallel to the axial direction. Hirth cogs are considered to be gear cogs having symmetric teeth.

The disclosure further results in a vehicle, in particular a two-wheeler, preferably an electric bike comprising the freewheel described.

Preferably, the vehicle further comprises a drive unit connected to the second shaft, in particular in a torque transmitting manner, and a crankshaft drive connected to the first shaft, in particular in a torque transmitting manner.

Alternatively or additionally preferably, the freewheel can be provided to a rear hub of a two-wheeler, for example an electric bike.

BRIEF DESCRIPTION OF THE DRAWINGS

The disclosure is described in the following with reference to exemplary embodiments in conjunction with the drawings. In the drawings, functionally identical components are identified with respectively identical reference characters. Shown are.

DETAILED DESCRIPTION

Figure 1:
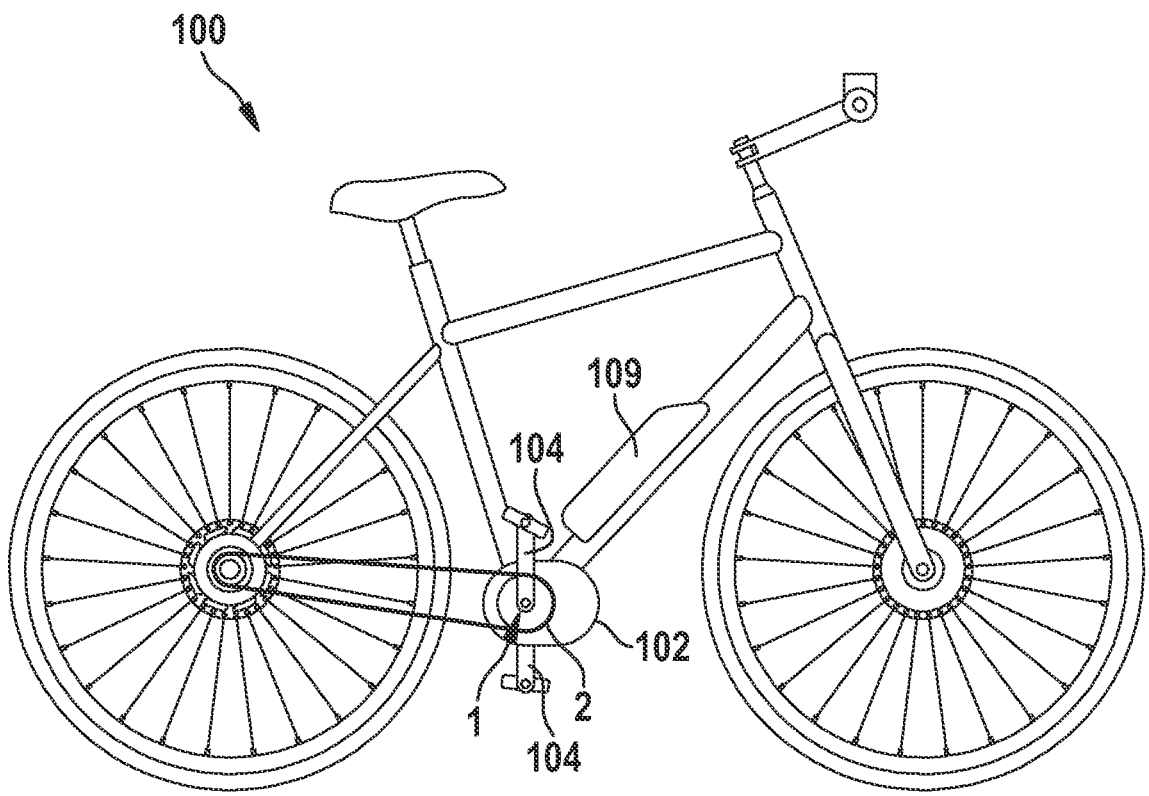
FIG. 1 a simplified schematic view of a vehicle comprising a freewheel according to a preferred embodiment of the disclosure, FIG. 2 a detailed sectional view of a drive of the vehicle of FIG. 1, and FIG. 3 a perspective view of the drive shown in FIG. 2.

FIG. 1 shows a simplified schematic view of a vehicle 100 comprising a freewheel 1 according to a preferred embodiment of the disclosure. The vehicle 100 is a vehicle 100 that can be operated with muscle power and/or motor power, in detail an electric bike.

The vehicle 100 comprises a drive unit 102 having a motor, in particular an electric motor. The motor can be powered using electrical energy by means of an electrical energy storage means 109 of the vehicle 100.

The drive unit 102 is arranged in the area of a bottom bracket of the electric bike 100. A motor torque generated by the motor can be used to provide motorized support for the pedaling force generated by the muscle power of a rider of the electric bike 100.

The muscle power of the driver can in this case be applied to a crankshaft (not shown) via a crank drive 104 which has cranks. The crankshaft is in this case arranged coaxially to a first shaft 2 and is in particular connected to the first shaft 2 in a torque transmitting manner. The first shaft 2 extends along a crank axis 15 and is arranged coaxially to a second shaft 3 (see FIGS. 2 and 3). The second shaft 3 is connected to the drive unit 102 in a torque transmitting manner. The second shaft 3 is a gear, to which, e.g., a torque from another gear, e.g. a transmission, of the drive unit 2 can be transferred.

The drive unit 102 can in this case drive the second shaft 3 by means of the generated motor torque. The second shaft 3 is arranged coaxially to the first shaft 2. A bearing 50 is in this case arranged between the first shaft 2 and the second shaft 3 to enable relative rotation. The bearing 50 can, e.g., be axially fixed to the first shaft 2 in an axially non-rotatable manner by means of a securing ring 51.

A freewheel 1 is provided between the first shaft 2 and the second shaft 3, which can produce or interrupt a torque transfer between the first shaft 2 and the second shaft 3, depending on the relative direction of rotation of the first shaft 2 and the second shaft 3.

The exact operation and design of the freewheel 1 is described in detail hereinafter with respect to FIGS. 2 and 3.

The freewheel 1 comprises a freewheel element 4 and a friction element 5, which are arranged substantially coaxially to the first 2 and second shaft 3.

The freewheel element 4 is in this case designed to be disc-shaped and is arranged directly on an outer circumference of the first shaft 2. By means of radial gear cogs 8 which can, e.g., be arranged in the form of a helical toothed spline shaft connection, the freewheel element 4 is arranged on the first shaft 2 to be displaceable in the axial direction und unable to rotate in the circumferential direction.

The freewheel element 4 comprises second front gear cogs 12 on a front axial face. First front gear cogs 11 are formed on the second shaft 3, in particular on a radially outwardly projecting flange of the second shaft 3. The first front gear cogs 11 and the second front gear cogs 12 are configured to effect torque transfer when engaged with each other.

In other words, when the freewheel element 4 is displaced to the right (in the direction indicated by arrow A in FIG. 2) towards the first front gear cogs 11 until the two front gear cogs 11, 12 engage with each other, a torque transfer between the second shaft 3 and the freewheel element 4 is enabled. The radial gear cogs 8 between the freewheel element 4 and the first shaft 2 thus also enables torque transfer between the first shaft 2 and the second shaft 3 via the freewheel element 4. This state in which the two front gear cogs 11, 12 engage with each other will be referred to as the engaged state of the gear cogs.

Figure 2:
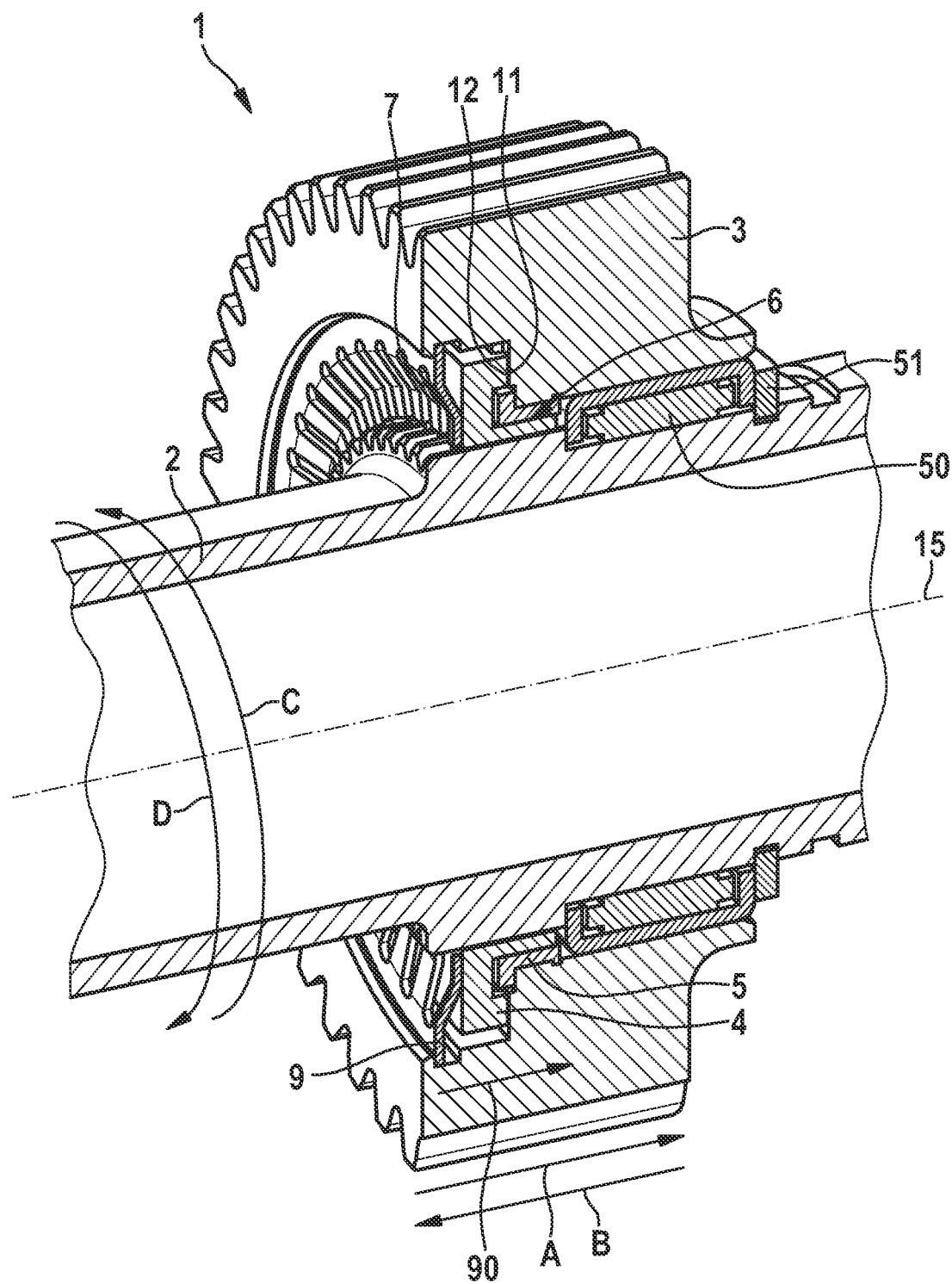

When the freewheel element 4 is displaced to the left (away from the first front gear cog 11 in the direction indicated by arrow B) in FIG. 2) until the two front gearings 11, 12 no longer engage with each other, the torque transfer between the second shaft 3 and the freewheel element 4, and thus also between the first shaft 2 and the second shaft 3, is interrupted. This state in which the two front gear cogs 11, 12 do not engage with each other will be referred to as the disengaged state of the gear cog.

The engagement and disengagement of the gear cog is therefore caused by the translational displacement of the freewheel element 4 along the axial direction relative to the second shaft 3, and in particular also relative to the first shaft 2.

This translational displacement of the freewheel element 4 is in this case effected as a function of a relative rotation of the first shaft 2 and the second shaft 3 in a specific rotational apparatus and by the friction element 5, as described hereinafter.

The friction element 5 is designed as a hollow shaft, or substantially sleeve-shaped, and is arranged radially outside of the first shaft 2 and a part of the freewheel element 4. The friction element 5 is in this case attached to the second shaft 3 in an axially non-rotatable manner, in which case relative rotation between the friction element 5 and the second shaft 3 is possible. In this case, however, a predetermined friction closure in the circumferential direction in the form of a friction closure formed between the friction element 5 and the second shaft 3, which closure causes the friction element 5 to rotate with the second shaft 3 if the friction closure is not overcome.

The freewheel 1 also comprises a helical mechanism 6, which is formed between the freewheel element 4 and the friction element 5. In the exemplary embodiment shown, the helical mechanism 6 in this case comprises a thread between a radially inner side of the friction element 5 and a radially outer side of the freewheel element 4. The thread of the helical mechanism 6 is in this case designed such that, during relative rotation of the first shaft 2 in the locking direction C, it causes the gear cog to engage, i.e., the tooth engagement of the two front gear cogs 11, 12 by displacing the freewheel element 4 in the direction of arrow A (see FIG. 2). In a similar manner, during relative rotation of the first shaft 2 in the opposite freewheel direction D, the disengagement of the gear cog, i.e., the release of the tooth engagement of the two front gear cogs 11, 12 is effected by displacing the freewheel element 4 in the direction of arrow B.

The freewheel 1 in this case also comprises a stop 7, which limits the axial displacement of the freewheel element 4 relative to the friction element 5. The stop 7 is formed on the second shaft 2.

When the freewheel element 4 is displaced far enough that the stop 7 is reached, the friction closure between the friction element 5 and the second shaft 3 is overcome during further relative rotation of the first shaft 2 in the freewheel direction D so that the friction element 5 and the second shaft 3 rotate relative to each other.

The freewheel further comprises a return element 9, which is arranged in the axial direction between the stop 7 and the freewheel element 4. The return element 9 is in this case designed as an axial spring disc. In detail, the return element 9 comprises a disk-shaped base region that adjoins the stop 7 and a plurality of spring fingers protruding from the base region radially inward and towards the freewheel element 4 that adjoin the freewheel element 4.

The return element 9 is in this case configured to apply a return force 90 on the freewheel element 4 by means of a spring force of the spring fingers. The freewheel element 4 is thereby pushed by the return element 9 towards the first front gear cogs 11 at any time.

The components of the freewheel 1, in detail the return element 9, the helical mechanism 6, and the force closure between the second shaft 3 and the friction element 5, are in this case designed such that a disengaging force is generated by the helical mechanism 6 and the force closure when the freewheel element 4 and friction element 5 rotate relative to one another in the freewheel direction, which force disengages the two gear cogs 11, 12 and which is greater than the return force 90. As a result, it is reliably ensured that the interruption of the torque transfer by the freewheel 1 when the freewheel element 4 and the friction element 5 rotate relative to one another in the freewheel direction.

If, in the disengaged state of the two gear cogs 11, 12, i.e., if they are not engaged with one another, the relative rotation of the freewheel element 4 and the friction element 5 stops, so the disengaging force of the helical mechanism 6 and force closure is also stopped. In this case, the return force 90 of the return element 9 causes the freewheel element 4 to be moved immediately towards the first gear cogs 11 such that the two gear cogs 11, 12 are immediately re-engaged with one another.

The movement of the freewheel element 4 by the return force 90 of the return element 9 is enabled by the thread of the helical mechanism 6 being designed not to be self-inhibiting. The return element 9 can thereby displace the freewheel element 4 axially relative to the friction element 5 when a disengaging force is no longer present.

By immediately re-engaging the front gear cogs 11, 12 immediately after the end of the rotation in the freewheeling direction, the torque transfer can be automatically restored, whereby a particularly low reaction time of the freewheel 1 can be provided.

It should be noted that, further preferably, a freewheel 1 can also be provided without the described reset element 9. Such a freewheel 1 is characterized by a particularly simple and inexpensive design. Preferably, a securing ring (not shown) can in this case be used as a stop 7. The locking of the freewheel 1 is in this case achieved by the front gear cogs 11, 12 being re-engaged by moving the freewheel element 4 by means of the helical mechanism 6.

What is claimed is:

1. A freewheel of a vehicle, comprising:
a first shaft;
a second shaft including a first gear cog;
a freewheel element including a second gear cog; and
a friction element,
wherein the first gear cog and the second gear cog are configured to, when engaged with each other, effect a torque transfer between the second shaft and the freewheel element,
wherein the freewheel element is arranged to be displaceable in the axial direction on the first shaft,
wherein the freewheel element is arranged to be non-rotatable relative to the first shaft in the circumferential direction,
wherein the freewheel element and the friction element are connected to each other by way of a helical mechanism which is configured to effect a translational displacement of the freewheel element and the friction element relative to each other during relative rotation of the freewheel element and the friction element, and
wherein the helical mechanism includes a thread.

2. The freewheel according to claim 1, wherein the thread is designed not to be self-inhibiting.

3. The freewheel according to claim 1, further comprising a stop configured to limit the translational displacement of the freewheel element relative to the friction element.

4. The freewheel according to claim 1, wherein the freewheel element is attached to the first shaft in an axially displaceable manner and in a non-rotatable manner in the circumferential direction by way of a radial gear cog.

5. A vehicle, comprising a freewheel according to claim 1.

6. The vehicle according to claim 5, wherein the vehicle is an electric bike.

7. The freewheel according to claim 1, wherein the vehicle is a two-wheeler.

8. A freewheel of a vehicle, comprising:
a first shaft;
a second shaft including a first gear cog;
a freewheel element including a second gear cog; and
a friction element; and
a return element which is arranged and configured to apply a return force to the freewheel element, wherein:
the first gear cog and the second gear cog are configured to, when engaged with each other, effect a torque transfer between the second shaft and the freewheel element,
the freewheel element is arranged to be displaceable in the axial direction on the first shaft,
the freewheel element is arranged to be non-rotatable relative to the first shaft in the circumferential direction,
the freewheel element and the friction element are connected to each other by way of a helical mechanism which is configured to effect a translational displacement of the freewheel element and the friction element relative to each other during relative rotation of the freewheel element and the friction element, and
the return force is oriented towards the first gear cog of the second shaft.

9. The freewheel according to claim 8, wherein the helical mechanism includes a thread.

10. The freewheel according to claim 8, wherein a force closure, the helical mechanism, and the return element are designed such that a disengaging force caused by the force closure and the helical mechanism when the freewheel element and the friction element rotate relative to one another is greater than the return force of the return element.

11. The freewheel according to claim 8, wherein the return element is an axial spring disc.

12. The freewheel according to claim 8, further comprising:
a stop configured to limit the translational displacement of the freewheel element relative to the friction element, wherein
the return element is arranged between the stop and the freewheel element.

13. The freewheel according to claim 12, wherein the stop is designed such that, when the freewheel element adjoins the stop, the gear cogs are completely disengaged from one another.

14. A freewheel of a vehicle, comprising:
a first shaft;
a second shaft including a first gear cog;
a freewheel element including a second gear cog; and
a friction element,
wherein the first gear cog and the second gear cog are configured to, when engaged with each other, effect a torque transfer between the second shaft and the freewheel element,
wherein the freewheel element is arranged to be displaceable in the axial direction on the first shaft,
wherein the freewheel element is arranged to be non-rotatable relative to the first shaft in the circumferential direction,
wherein the freewheel element and the friction element are connected to each other by way of a helical mechanism which is configured to effect a translational displacement of the freewheel element and the friction element relative to each other during relative rotation of the freewheel element and the friction element, and
wherein a predetermined force closure in the circumferential direction is formed between the second shaft and the friction element.

15. The freewheel according to claim 14, wherein:
the force closure between the second shaft and the friction element includes a friction force in the circumferential direction, and/or
the force closure between the second shaft and the friction element includes a magnetic force.

16. A freewheel of a vehicle, comprising:
a first shaft;
a second shaft including a first gear cog;
a freewheel element including a second gear cog; and
a friction element,
wherein the first gear cog and the second gear cog are configured to, when engaged with each other, effect a torque transfer between the second shaft and the freewheel element,
wherein the freewheel element is arranged to be displaceable in the axial direction on the first shaft,
wherein the freewheel element is arranged to be non-rotatable relative to the first shaft in the circumferential direction,
wherein the freewheel element and the friction element are connected to each other by way of a helical mechanism which is configured to effect a translational displacement of the freewheel element and the friction element relative to each other during relative rotation of the freewheel element and the friction element, and
wherein the helical mechanism is designed such that the corresponding relative translational displacement during relative rotation in the freewheel direction disengages the tooth engagement of the gear cog and, during relative rotation in the locking direction, engages the tooth engagement of the gear cogs.

17. A freewheel of a vehicle, comprising:
a first shaft;
a second shaft including a first gear cog;
a freewheel element including a second gear cog; and
a friction element,
wherein the first gear cog and the second gear cog are configured to, when engaged with each other, effect a torque transfer between the second shaft and the freewheel element,
wherein the freewheel element is arranged to be displaceable in the axial direction on the first shaft,
wherein the freewheel element is arranged to be non-rotatable relative to the first shaft in the circumferential direction,
wherein the freewheel element and the friction element are connected to each other by way of a helical mechanism which is configured to effect a translational displacement of the freewheel element and the friction element relative to each other during relative rotation of the freewheel element and the friction element, and
wherein the friction element is attached to the second shaft in an axially non-displaceable manner.

18. A vehicle further comprising:
a freewheel comprising:
a first shaft;
a second shaft including a first gear cog;
a freewheel element including a second gear cog; and
a friction element,
a drive unit connected to the second shaft; and
a crank drive connected to the first shaft,
wherein the first gear cog and the second gear cog are configured to, when engaged with each other, effect a torque transfer between the second shaft and the freewheel element,
wherein the freewheel element is arranged to be displaceable in the axial direction on the first shaft,
wherein the freewheel element is arranged to be non-rotatable relative to the first shaft in the circumferential direction, and
wherein the freewheel element and the friction element are connected to each other by way of a helical mechanism which is configured to effect a translational displacement of the freewheel element and the friction element relative to each other during relative rotation of the freewheel element and the friction element.

* * * * *